United States Patent
Kalgraf et al.

(10) Patent No.: US 6,178,191 B1
(45) Date of Patent: Jan. 23, 2001

(54) METHOD FOR DETERMINATION OF THE TIP POSITION OF CONSUMABLE ELECTRODES USED IN ELECTRIC SMELTING FURNACES

(75) Inventors: Kjell Kalgraf; Gunnar Morkesdal; Ragnar Tronstad, all of Kristiansand (NO)

(73) Assignee: Elkem ASA (NO)

( * ) Notice: Under 35 U.S.C. 154(b), the term of this patent shall be extended for 0 days.

(21) Appl. No.: 09/423,959

(22) PCT Filed: Mar. 8, 1999

(86) PCT No.: PCT/NO99/00080

§ 371 Date: Nov. 15, 1999

§ 102(e) Date: Nov. 15, 1999

(87) PCT Pub. No.: WO99/47873

PCT Pub. Date: Sep. 23, 1999

(30) Foreign Application Priority Data

Mar. 18, 1998 (NO) .................................................. 19981210

(51) Int. Cl.⁷ ..................................................... H05B 3/60
(52) U.S. Cl. .................................. 373/50; 373/49; 373/105
(58) Field of Search ................................. 373/42, 46, 47, 373/49, 50, 53, 102, 104, 105

(56) References Cited

U.S. PATENT DOCUMENTS

| | | |
|---|---|---|
| 3,619,464 * | 11/1971 | Holzgruber et al. .................... 373/49 |
| 4,096,344 | 6/1978 | Munson . |
| 4,349,912 | 9/1982 | Bello . |
| 4,395,771 * | 7/1983 | Medovar et al. ....................... 373/49 |
| 5,115,447 * | 5/1992 | Bowman ............................... 373/102 |
| 5,687,187 * | 11/1997 | Weischedel et al. ................. 373/105 |
| 5,930,284 * | 7/1999 | Hysinger et al. ....................... 373/50 |

FOREIGN PATENT DOCUMENTS 362703    12/1973    (SE) .

* cited by examiner

Primary Examiner—Tu Ba Hoang
(74) Attorney, Agent, or Firm—Bierman, Muserlian and Lucas

(57) ABSTRACT

The present invention relates to a method for determination of the electrode tip position for consumable electrodes in electric smelting furnaces, which electrodes being submerged in the furnace charge. The voltage between two geometrically displaced points on the outside of the steel wall of the furnace pot is measured during operation of the furnace, points being situated as close as possible to the electrode for which the electrode tip position is to be determined, and as far away as possible from the other electrodes in the furnace. The electrode current for the electrode for which the electrode tip position is to be determined, is recorded at the same time as the voltage between the two points are measured, whereafter the difference between measured voltage between the two points and measured electrode current is calculated, and where the absolute value of difference increases when the electrode tip position increases and decreases when the absolute value of difference decreases.

Figure 1:
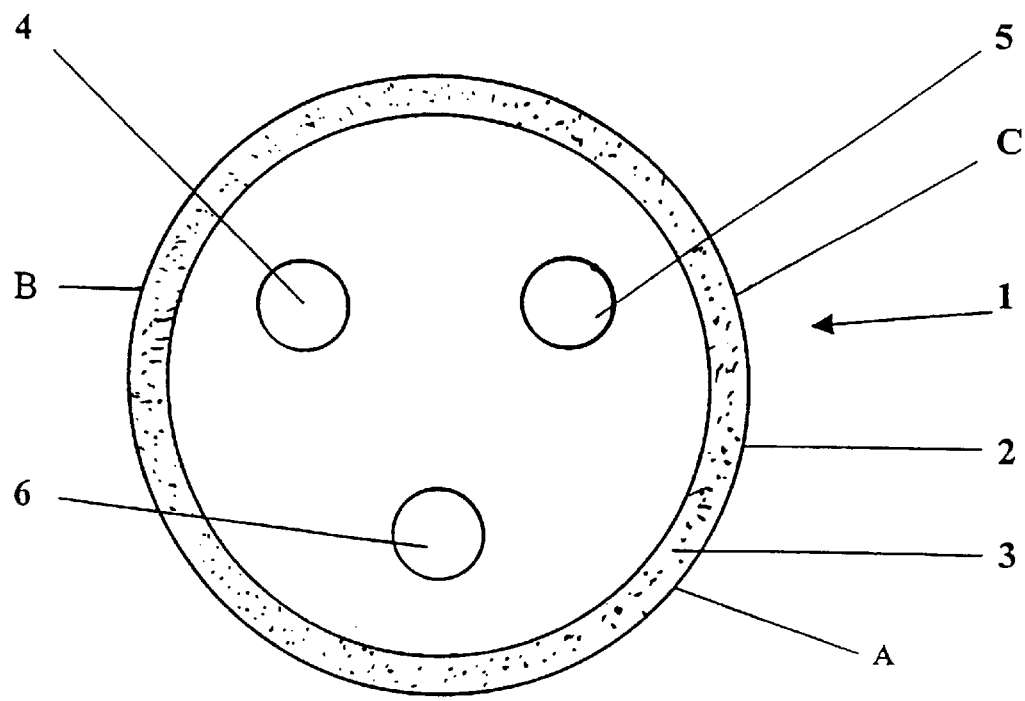

4 Claims, 2 Drawing Sheets a furnace pot 1 having an outer steel wall 2 and an inner

METHOD FOR DETERMINATION OF THE TIP POSITION OF CONSUMABLE ELECTRODES USED IN ELECTRIC SMELTING FURNACES

TECHNICAL FIELD

The present invention relates to a method for determination of the electrode tip position for consumable electrodes used in electric smelting furnaces, and particularly electrodes used in furnaces where the electrodes are submerged in the furnace charge during operation of the furnaces.

BACKGROUND ART

In electric smelting furnaces for the production of ferro alloys, silicon, pig iron etc., it is used consumable carbon electrodes which during operation of the furnace are submerged in the furnace charge. The electrodes are being held by electrode holders to which also electric operating current is being supplied to the electrodes. The electrodes are being regulated up and down in vertical direction by means of hydraulic cylinders in order to maintain a preset electrode current or a preset electric resistance. The electrode holder system further comprises means for slipping of the electrodes through the electrode holders to compensate for the electrode consumption.

The electrode tip positions in the furnace are important regulating parameters for operation of electric smelting furnaces. It has, however, been found that it is difficult to determine the electrode tip position at a sufficient accuracy. Conventionally, the electrode tip positions are measured by manual measurements which can only be done at long time intervals as manual determinations of electrode tip positions requires that the charge is melted down, whereafter the furnace has to be shut down in order to manually determine the electrode tip positions. This procedure causes interruption of the furnace operation and is therefore done as seldom as possible.

A number of other methods have been proposed for determination of the electrode length and the electrode tip position for electrodes in electric smelting furnaces. None of these methods have, however, found any use in practice. Electrode tip position as used herein shall mean the vertical position of the lower end of the electrode measured relative to a reference point on the smelting furnace. The reference point can for instance be the bottom of the smelting furnace. The electrode tip position will in this case be determined as the distance between the electrode tip and the furnace bottom.

DISCLOSURE OF INVENTION

By the present invention one has arrived at a simple method for determination of the electrode tip position for electrodes in electric smelting furnaces.

Accordingly, the present invention relates to a method for determination of the electrode tip position for consumable electrodes in electric smelting furnaces, said electrodes being submerged in the furnace charge, which method is being characterized in that the voltage between two geometrically displaced points on the outside of the steel wall of the furnace pot is measured during operation of the furnace, said points being situated as close as possible to the electrode for which the electrode tip position is to be determined, and as far away as possible from the other electrodes in the furnace, that the electrode current for the electrode for which the electrode tip position is to be determined, is recorded at the same time as the voltage between the two points are measured, whereafter the difference between measured voltage between the two points and measured electrode current is calculated, and where the absolute value of said difference increases when the electrode tip position increases and decreases when the absolute value of said difference decreases.

According to a preferred embodiment of the present invention the electrode tip position is determined according to the following formula:

$$E_{tp} = RP + b(a \times \text{voltage} - \text{electrode current}),$$

where $E_{tp}$ = electrode tip position,
RP = a fixed reference point on the furnace,
voltage = voltage measured between the two points on the steel furnace pot, and where
a and b are constants which have to be established for each electrode.

The two points on the outside of the steel wall of the furnace pot which are geometrically displaced, can be situated freely. Thus they can favorably be situated both on a vertical line and on a horizontal line, and in fact in any other configuration.

It has very surprisingly been found that there exists a close correlation between the electrode tip position and voltage measured on the furnace wall just outside the electrode for which the electrode tip position is to be determined.

From the above formula it is seen that if the electrode current is constant, the change in electrode tip position is only dependant on the measured voltage difference between the two points on the steel wall of the furnace pot.

The method according to the present invention can be used for all types of electric furnaces and processes where one uses submerged consumable electrodes. The method can thus be used both for furnaces having a circular cross-section and for furnaces having a rectangular cross-section. The method can be used both for alternating current furnaces equipped with one electrode as well as for furnaces equipped with more than one electrode.

The method according to the present invention is preferably used for stationary furnaces, but tests have shown that it also can be used to determine electrode tip position for electrodes in rotating furnaces. Rotating furnaces are particularly used for the production of silicon. When the method according to the present invention is used to determine electrode tip position for electrodes in rotating furnaces, one must, in order to obtain good results, use a number of measuring points about the circumference of the furnace wall in order to always be able to measure the voltage between two points on the furnace wall as close as possible to the electrode for which the electrode tip position is to be determined.

DETAILED DISCLOSURE OF THE INVENTION

Figure 2:
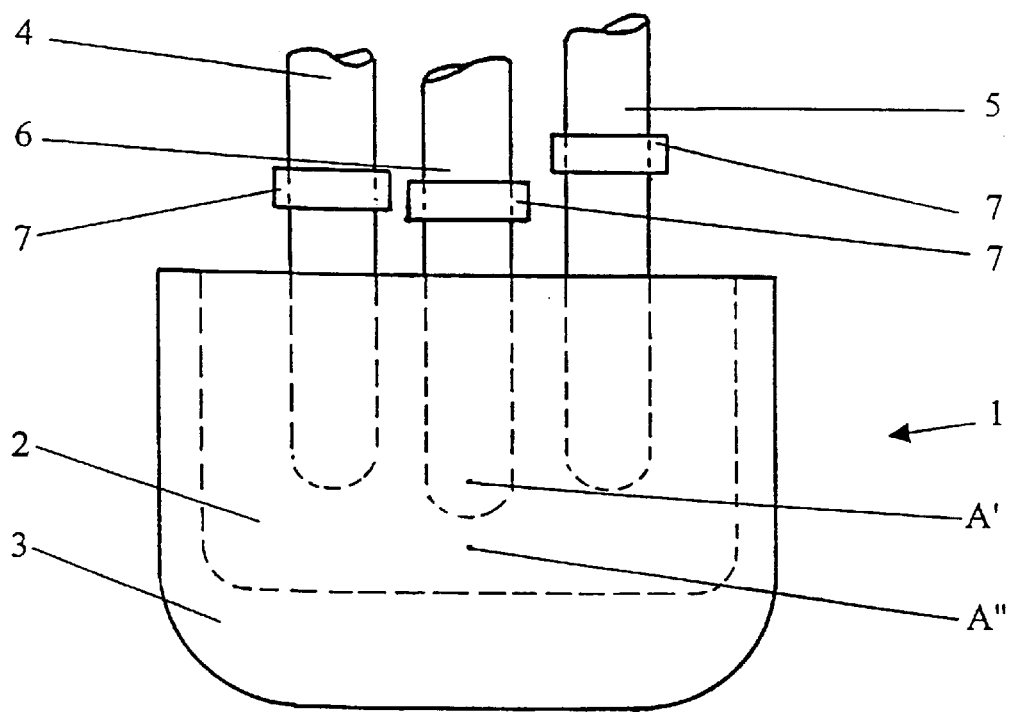
Figure 3:
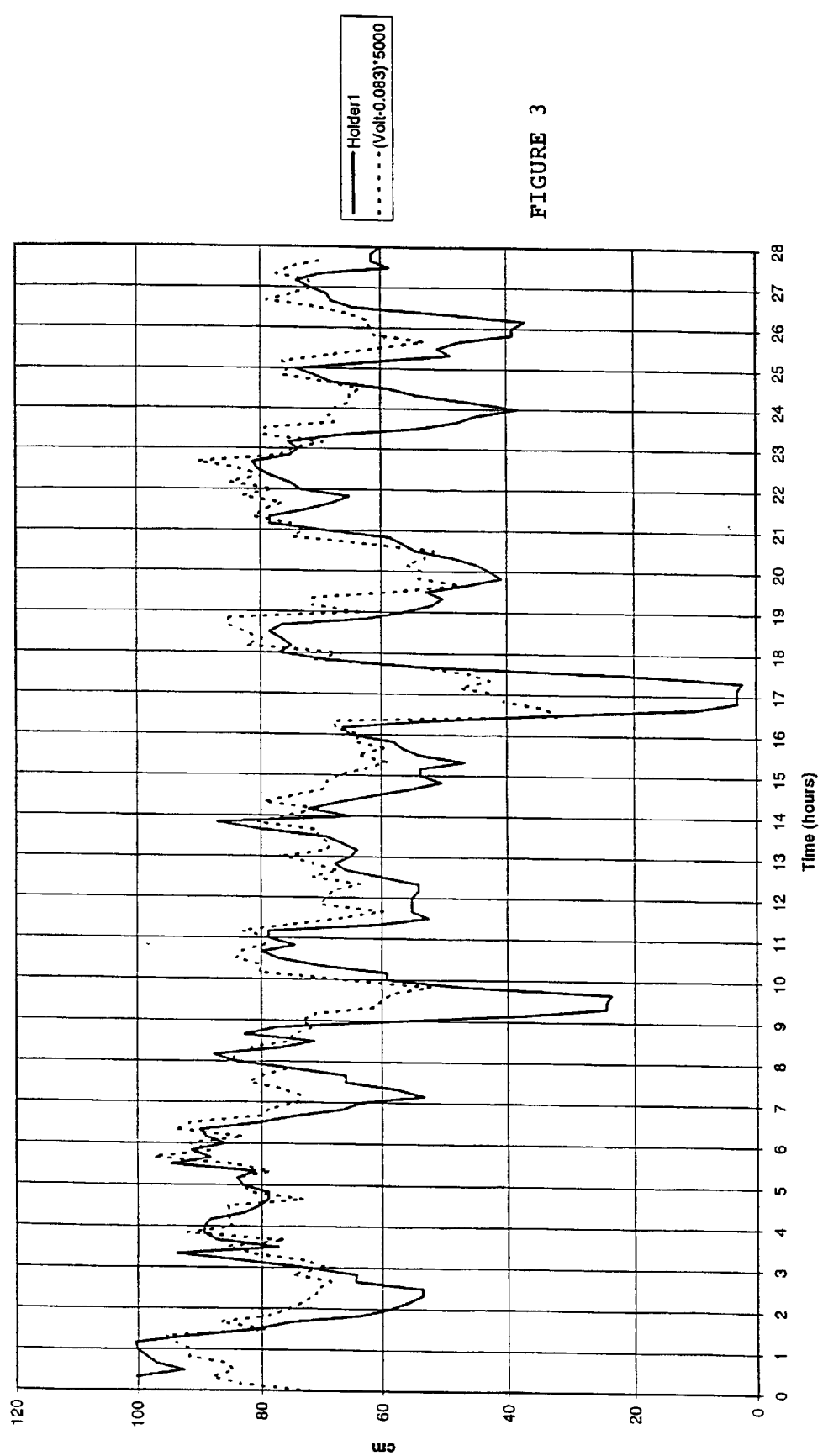

The method of the present invention will now be further described with reference to the accompanying drawings, where, FIG. 1 shows a view from above of an electric smelting furnace having three electrodes, FIG. 2 shows a side view of the furnace pot on FIG. 1, and where, FIG. 3 is a diagram showing the correlation between the electrode holder position and measured voltage on the furnace wall for a ferromanganese furnace.

On FIG. 1 there is shown an electric smelting furnace with a furnace pot 1 having an outer steel wall 2 and an inner refractory lining 3. The furnace is equipped with three electrodes 4, 5, 6 arranged in triangle and which during operation of the furnace is submerged in furnace charge (not shown). The electrodes 4, 5, 6 are equipped with conventional means 7 for holding the electrodes and for supply of electric operating current to the electrodes. The electrodes are further in conventional way equipped with means (not shown) for slipping and regulation of the electrodes.

On FIG. 1 three points A, B and C are shown on the furnace wall 2. The point A is closest to electrode 6 and farthest away from the electrode 4 and 5. The point B is closest to electrode 4 and farthest away from the electrode 5 and 6, while the point C is closest to electrode 5 and farthest away from the electrodes 4 and 6.

On FIG. 2 a part of the furnace pot 1 is shown from the outside with point A in center. On the steel wall 2 there is arranged two points A' and A" which points are situated on a vertical line through point A. By the method according to the present invention the voltage between the points A' and A" on the furnace wall is measured and at the same time the electrode current for electrode 6 is recorded. It has surprisingly been found that change in electrode tip position is closely correlated to measured voltage and electrode current in such a way that the absolute value of difference between the measured voltage and electrode current increases when the electrode tip position increases and that the absolute value of the difference between measured voltage and electrode current decreases when the electrode tip positions for electrode 6 decreases. By making curves for the difference between measured voltage between two points on the furnace wall and the electrode current, the movements of the electrode tips during time can be determined, as an increase in the absolute value of the difference between voltage and the electrode current means that the electrode tip of an electrode is moved upwards in the furnace, while a decrease in the absolute value of the difference between the voltage and the electrode current means that the electrode tip is lowered downwards in the furnace.

EXAMPLE

In an electric smelting furnace having a circular cross-section and used for the production of ferromanganese, the voltage between a reference point and a point on the furnace wall in use outside each of the three electrodes was measured. The voltage measurements were made at 10 minutes intervals and at the same time the electrode holder positions were registered. The electrode current was constant during the voltage measurement period. On FIG. 3 the electrode holder positions and the measured voltage are shown as a function of time. As can be seen from FIG. 3 there is a surprisingly good correlation between the measured voltage and the electrode holder position.

What is claimed is:

1. Method for determination of the electrode tip position for consumable electrodes in electric smelting furnaces, said electrodes being submerged in the furnace charge, characterized in that the voltage between two geometrically displaced points on the outside of the steel wall of the furnace pot is measured during operation of the furnace, said points being situated as close as possible to the electrode for which the electrode tip position is to be determined, and as far away as possible from the other electrodes in the furnace, that the electrode current for the electrode for which the electrode tip position is to be determined, is recorded at the same time as the voltage between the two points are measured, whereafter the difference between measured voltage between the two points and measured electrode current is calculated, and where the absolute value of said difference increases when the electrode tip position increases and decreases when the absolute value of said difference decreases.

2. Method according to claim 1, characterized in that the electrode tip position is determined according to the formula:

$$E_{tp}=RP+b(a\times\text{voltage}-\text{electrode current}),$$

where $E_{tp}$=electrode tip position,

RP=a fixed reference point on the furnace, voltage=voltage measured between the two points on the steel furnace pot, and where a and b are constants which have to be established for each electrode.

3. Method according to claim 1, characterized in that the two points outside of the steel wall of the furnace pot between which the voltage is measured are situated on a vertical line.

4. Method according to claim 1, characterized in that the two points outside of the steel wall of the furnace pot between which the voltage is measured are situated on a horizontal line.

* * * * *